United States Patent
Hsu et al.

(10) Patent No.: US 10,756,609 B2
(45) Date of Patent: Aug. 25, 2020

(54) DISTRIBUTED ELECTROMAGNETIC APPARATUS

(71) Applicant: YUZEN SUSTAINABLE ENERGY CO., LTD., Taichung (TW)

(72) Inventors: Yungshun Hsu, Taichuung (TW); Mingchun Hsu, Taichuung (TW); Wenyu Hsu, Taichuung (TW)

(73) Assignee: YUZEN SUSTAINABLE ENERGY CO., LTD., Taichung (TW)

( * ) Notice: Subject to any disclaimer, the term of this patent is extended or adjusted under 35 U.S.C. 154(b) by 174 days.

(21) Appl. No.: 16/064,460

(22) PCT Filed: Dec. 22, 2015

(86) PCT No.: PCT/CN2015/098160
§ 371 (c)(1),
(2) Date: Jun. 21, 2018

(87) PCT Pub. No.: WO2017/107029
PCT Pub. Date: Jun. 29, 2017

(65) Prior Publication Data
US 2019/0006928 A1 Jan. 3, 2019

(51) Int. Cl.
*H02K 35/02* (2006.01)
*H02K 1/14* (2006.01)
*H02K 1/27* (2006.01)

(52) U.S. Cl.
CPC .............. *H02K 35/02* (2013.01); *H02K 1/14* (2013.01); *H02K 1/2746* (2013.01)

(58) Field of Classification Search
CPC .......... H02K 35/02; H02K 35/06; H02K 1/14; H02K 1/2746
See application file for complete search history.

(56) References Cited

U.S. PATENT DOCUMENTS

| | | | | |
|---|---|---|---|---|
| 6,917,136 B2 * | 7/2005 | Thornton | ................. | H02K 1/08 310/254.1 |
| 9,343,930 B2 * | 5/2016 | Hoffman | ................. | H02K 1/185 |

* cited by examiner

*Primary Examiner* — Emily P Pham
(74) *Attorney, Agent, or Firm* — Leong C. Lei

(57) ABSTRACT

The present invention discloses a distributed electromagnetic apparatus is made up of an induction coil assembly and a magnet assembly to reduce increase magnetic stress and loss of kinetic energy. The magnet assembly has at least one magnetic member arranged at each of two ends of the coil such that the magnetic members are arranged in pair as being opposite to each other with opposite polarities facing each other. The center of the magnetic member corresponds to an axis of the coil and centers of the magnetic members that are located at two opposite sides being each set at a location between centers of two adjacent conjugate teeth of the magnetic conductor. The magnetic member generates magnetic stress to form inclined forces in opposite directions so that horizontal force components on two sides are opposite in directions and cancel each other and vertical force components on two sides are reduced.

3 Claims, 5 Drawing Sheets

DISTRIBUTED ELECTROMAGNETIC APPARATUS

(a) TECHNICAL FIELD OF THE INVENTION

The present invention relates to an electromagnetic technical field, and more particularly to a distributed electromagnetic apparatus that reduces a vertical attraction force in order to reduce starting force in a static condition and also to reduce increase of magnetic resisting force in a dynamic condition to reduce loss of kinetic energy caused by increased magnetic stress due to loading to thereby increase energy conversion rate thereof.

(b) DESCRIPTION OF THE PRIOR ART

As shown in FIG. 1, a known electromagnetic apparatus is made up of an induction coil assembly 10 and a magnet assembly 20, wherein the induction coil assembly 10 comprises a coil 11, and the magnet assembly 20 comprises a magnetic member 21, 22 arranged at each of two ends of an axis of the coil 11. The two magnetic members 21, 22 of the magnet assembly 20 are arranged to have opposite polarities facing each other. The two magnetic members 21, 22 of the magnet assembly 20 and the coil 11 of the induction coil assembly 10 are respectively defined as a rotor and a stator, wherein, through relative linear or rotary movement, the coil 11 of the induction coil assembly 10 cuts through the magnetic lines of force of the magnet assembly 20 to induce a voltage so as to achieve the purpose of generation of electricity.

As shown in FIG. 1, in a static condition, the two magnetic members 21, 22 each comprises a unidirectional attraction point and a vertical force component of the static magnetic attraction effect thereof is great so as to generate a magnetic attraction force that increases resistance against starting, making it hard to start and impossible to drive with a minute force for generating electricity.

Further, under dynamic loading of the electromagnetic apparatus, as shown in FIGS. 2A-2C, when the magnet assembly 20 is to move into the induction coil assembly 10 (as shown in FIG. 2A), two ends of the coil 11 of the induction coil assembly 10 的 the coil 11 are induced, through magnetic excitation, to generate polarities that are identical to those of the magnetic members 21, 22 of the magnet assembly 20 so as to cause an effect of blocking in opposite direction through repulsion between identical polarities, wherein a vertical repulsion force and the horizontal force component are each a force in an opposite direction so as to increase the magnetic resisting force and the electromagnetic apparatus is affected by loss of kinetic energy to have the rotational speed thereof reduced. When the polarity center of the magnetic member 21, 22 of the magnet assembly 20 correspond to the axis of the coil 11 (as shown in FIG. 2B), no force component is generated and it is entirely a vertical attraction force and is an opposite force so as to cause an increase of the magnetic resisting force, and the electromagnetic apparatus is affected by the loss of kinetic energy. When the magnet assembly 20 is moving away from the coil 11 (as shown in FIG. 2C), the two ends of the coil 11 of the induction coil assembly 10 are induced, through magnetic excitation, to become opposite to the polarities of the magnetic members 21, 22 of the magnet assembly 20 so as to cause an effect of pulling in opposite direction through attraction between opposite polarities and the vertical attraction force and the horizontal force component are each an opposite force so as to cause an increase of magnetic resisting force, and thus, the electromagnetic apparatus is still affected by loss of kinetic energy and the rotational speed thereof is reduced.

In other words, since for the existing electromagnetic apparatus, in either static or dynamic condition, magnetic stress is all affected by opposite forces so as to cause an increase of the magnetic resisting force and the electromagnetic apparatus is affected by loss of kinetic energy to reduce the rotational speed thereof and also suffers problems of being difficult to start so that the force of operating the rotor of the electromagnetic apparatus must be enlarged and there is no way for application for power generation with minute force. Thus, it is a direction of development of this industry to address the above problems.

Thus, the present inventor have worked deeply on the issues that application of the known electromagnetic apparatus faces and aggressively searches for a solution based on years' experience of development as engaging in the related industry, to thereby, through endeavor of repeated study and trial to eventually successfully developed a distributed electromagnetic apparatus, which overcomes the shortcomings and loss of the known electromagnetic apparatus caused by opposite magnetic stress.

SUMMARY OF THE INVENTION

An objective of the present invention is to provide a distributed electromagnetic apparatus that helps cancel a horizontal force component in order to make starting easy to provide an effect of driving with minute force thereby increasing utilization of energy.

Another objective of the present invention is to provide a distributed electromagnetic apparatus that helps increase a forward magnetic assistance force in order to reduce opposite magnetic stress, reduce loss of kinetic energy, and to increase kinetic energy thereof, to thereby further improve energy conversion rate.

To achieve the above objectives, a solution provided in this invention is as follows:

A distributed electromagnetic apparatus comprises an induction coil assembly that is defined as a stator or a rotor and a magnet assembly that is defined as a rotor or a stator;

the induction coil assembly comprises a magnetic conductor and a coil is wound around an outer circumference of the magnetic conductor, a direction of extension of winding turns of the coil on the magnetic conductor being perpendicular to a moving direction of the rotor, two ends of the magnetic conductor being made projecting outward to form at least two spaced conjugate teeth, each of the conjugate teeth having the same width and height, a tooth valley section being formed between adjacent conjugate teeth, each of the tooth valley sections having the same width and depth; and the magnet assembly is arranged to have at least one spaced magnetic member on two ends of the coil, the magnetic members being arranged in pair as being opposite to each other with opposite polarities facing each other, one of the magnetic members that is located at the middle having a center corresponding to an axis line of the coil, centers of the magnetic members that are located at two opposite sides being each set at a location between centers of two adjacent conjugate teeth of the magnetic conductor, the magnetic members on the same side being arranged to space from each other at fixed intervals, each of the magnetic members being of the same size.

The two ends of the magnetic conductor of the induction coil assembly are each provided with four conjugate teeth that are equally spaced and uniformly distributed on two opposite sides of the axis line, the magnet assembly having three magnet members at each of two ends of the coil, wherein a center of a middle one of the magnetic member corresponds to the axis of the coil and the magnetic members on the two sides have centers each of which is set at a location between centers of two corresponding adjacent conjugate teeth.

A distributed electromagnetic apparatus comprises an induction coil assembly that is defined as a stator or a rotor and a magnet assembly that is defined as a rotor or a stator;

the induction coil assembly comprises a magnetic conductor and a coil is wound around an outer circumference of the magnetic conductor, a direction of extension of winding turns of the coil on the magnetic conductor being perpendicular to a moving direction of the rotor, two ends of the magnetic conductor being made projecting outward to form two spaced conjugate teeth, each of the conjugate teeth having the same width and height, a tooth valley section being formed between the two conjugate teeth; and the magnet assembly is arranged to have one magnetic member on two ends of the coil, the magnetic members being opposite to each other with opposite polarities facing each other, the magnetic member having a center corresponding to an axis of the coil, the magnetic members on the two sides being of the same size.

By adopting the above solutions, the distributed electromagnetic apparatus of the present invention uses two magnetic stresses that are opposite in direction between the magnetic members of the magnet assembly and the conjugate teeth on two sides of the magnetic conductor to break the arrangement that the magnetic acting force maintains constant and shows a floating condition to thereby make the magnetic stresses of the magnetic members with respect to the conjugate teeth of the two sides to form inclined forces of opposite directions, making the horizontal force components on the two sides opposite in directions and cancel each other and also making the vertical force components on the two sides reduced so as to make the static magnetic attraction force far less than that of the prior art, to thereby achieve an effect of easy starting and achieve the purpose of driving with a minute force to thereby effectively increase utilization of energy and also to make the increase of magnetic stress reduced to thereby generate a forward magnetic assistance force to effectively reduce loss of kinetic energy, further improving energy conversion rate thereof so as to greatly increase the value thereof and also heighten the economic value thereof.

DETAILED DESCRIPTION OF THE PREFERRED EMBODIMENTS

Figure 1:
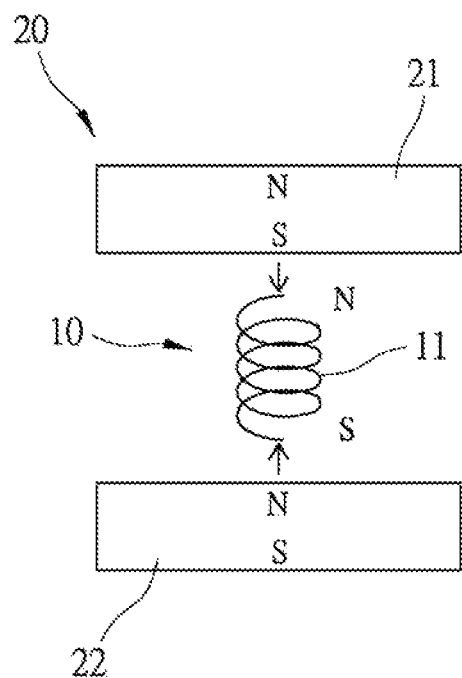
FIG. 1 is a schematic view illustrating a structure of a known electromagnetic apparatus.
Figure 2A:
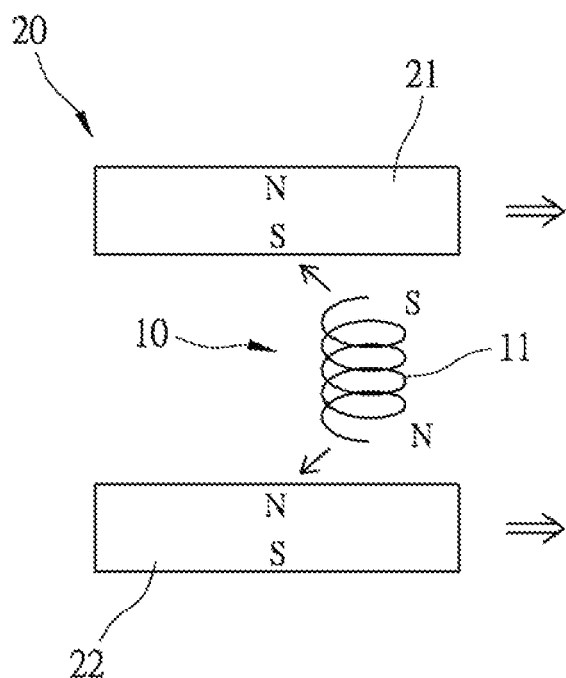
FIGS. 2A, 2B, and 2C are schematic views illustrating the effect of magnetic stress of the known electromagnetic apparatus in a dynamic condition.
Figure 2B:
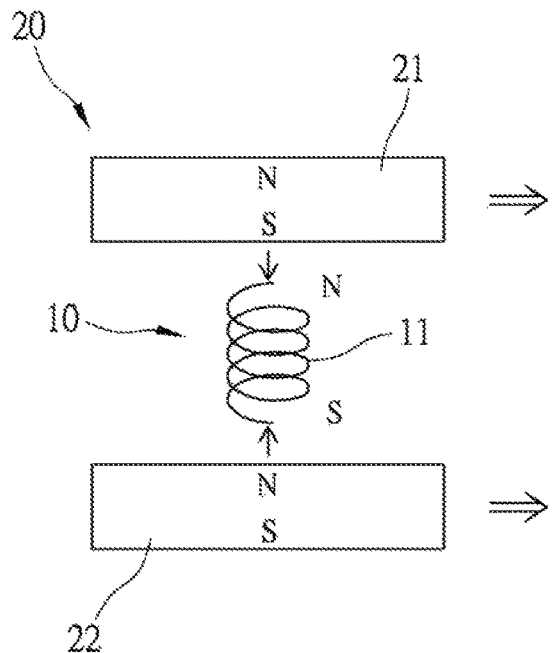
Figure 2C:
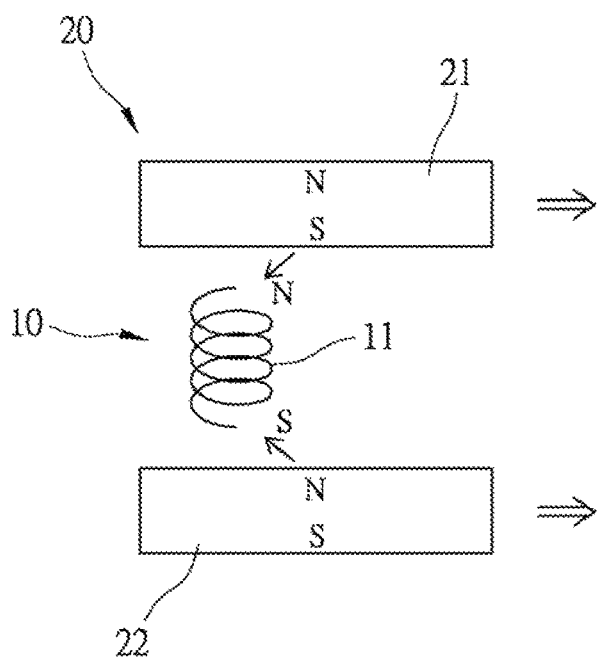

To further explain the technical solution of the present invention, the following provides a detailed description of the present invention with reference to embodiments thereof. It is noted that in the embodiments of the present invention, as well as components/parts thereof, as exemplified in the drawings, references that are made to the terms of "front and rear", "left and right", "top and bottom", "upper and lower" and "horizontal and vertical" are taken simply for the purposes of easing the description and are not intended to impose limitations to the present invention, nor are they intended to limit any component/part to be at a specific location or in a specific spatial direction. Dimensional sizes that are shown in the drawings or described in the specification may be varied according to the designs and requirements of the specific embodiments of the present invention, without departure from the scope of the present invention as defined in the appended claims.

Figure 3:
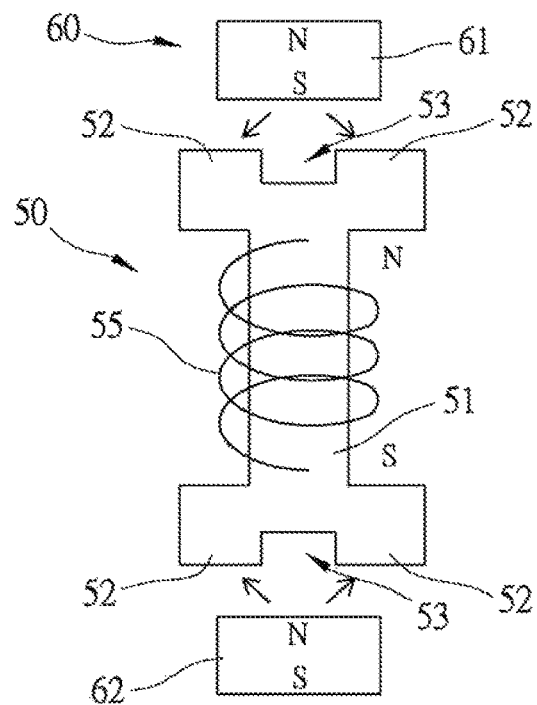
FIG. 3 is a schematic view illustrating a structure of a preferred embodiment of a distributed electromagnetic apparatus of the present invention, showing a state of magnetic stress thereof in a static condition.

A distributed electromagnetic apparatus according to the present invention is structured, as shown in FIG. 3, as comprising an induction coil assembly 50 and a magnet assembly 60. The induction coil assembly 50 and the magnet assembly 60 may be respectively defined as a stator and a rotor, and the induction coil assembly 50 and the magnet assembly 60 may generate a rotary or linear relative movement therebetween so that the electromagnetic apparatus may provide an effect of electricity generation through cutting magnetic lines of force.

The structure feature of the present invention is that the induction coil assembly 50 comprises a magnetic conductor 51 and a coil 55 is wound around an outer circumference of the magnetic conductor 51. A direction of extension of winding turns of the coil 55 on the magnetic conductor 51 is perpendicular to a moving direction of the magnet assembly 60 that serves as the rotor. Further, two ends of the magnetic conductor 51 are each made projecting outward to form at least two conjugate teeth 52 that are spaced from each other, wherein each of the conjugate teeth 52 has the same width and height and a tooth valley section 53 is formed between every two adjacent ones of the conjugate teeth 52 such that each of the tooth valley sections 53 has the same width and depth.

The magnet assembly 60 is arranged to have at least one spaced magnetic member 61, 62 on each of two ends of the coil 55 and the magnetic members 61, 62 are arranged in pair as being opposite to each other with opposite polarities facing each other. One of the magnetic members 61, 62 that is located at the middle has a center corresponding to an axis line of the coil 55, while centers of the magnetic members 61, 62 that are on two opposite sides are each set at a location between centers of two adjacent conjugate teeth 52 of the magnetic conductor 51. The magnetic members 61, 62 on the same side are arranged to space from each other at fixed intervals. Each of the magnetic members 61, 62 is of the same size.

As such, a distributed electromagnetic apparatus that is easy to start and reduce kinetic energy loss is formed.

In actual uses of the distributed electromagnetic apparatus of the present invention, as shown in FIGS. 3 and 4A-4C, in this example, explanation will be given with the magnet assembly 60 functioning as a rotor and the induction coil assembly 50 being a stator. Firstly, a static condition is provided as an example. Referring to FIG. 3, the magnetic members 61, 62 of the magnet assembly 60 on the two ends of the coil 55 of the induction coil assembly 50 are set in alignment with the axis of the coil 55, and the conjugate teeth 52 arranged on the ends of the magnetic conductor 51 are spaced from each other at intervals of fixed distance so that magnetic attraction forces of the magnetic member 61, 62 with respect to the conjugate teeth 52 on opposite sides thereof are inclined forces of opposite directions and the horizontal force components on the two opposite sides cancel each other and the vertical force components on the two opposite sides are reduced, whereby the resultant static magnetic attraction force is far smaller than that of the prior art device and thus an effect of easy starting can be achieved and the purpose of driving with a minute force may also be achieved to thereby effectively improve utilization of energy.

Figure 4A:
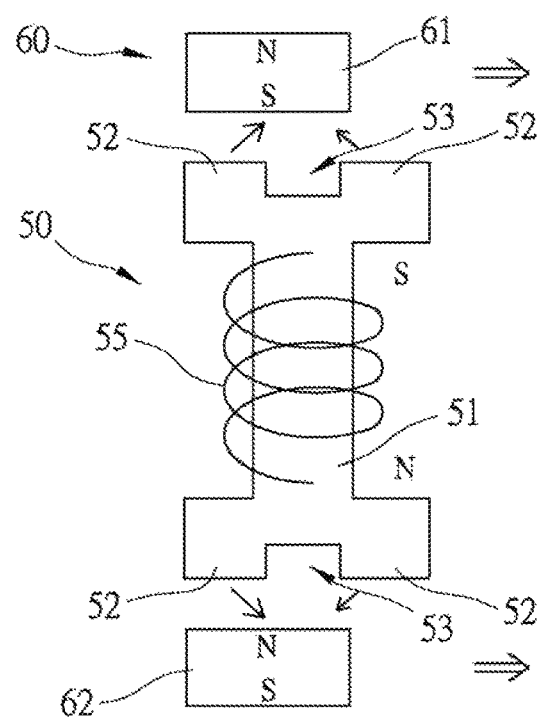
FIGS. 4A, 4B, and 4C are schematic views illustrating the effect of magnetic stress of the distributed electromagnetic apparatus of the present invention in a dynamic condition.
Figure 4B:
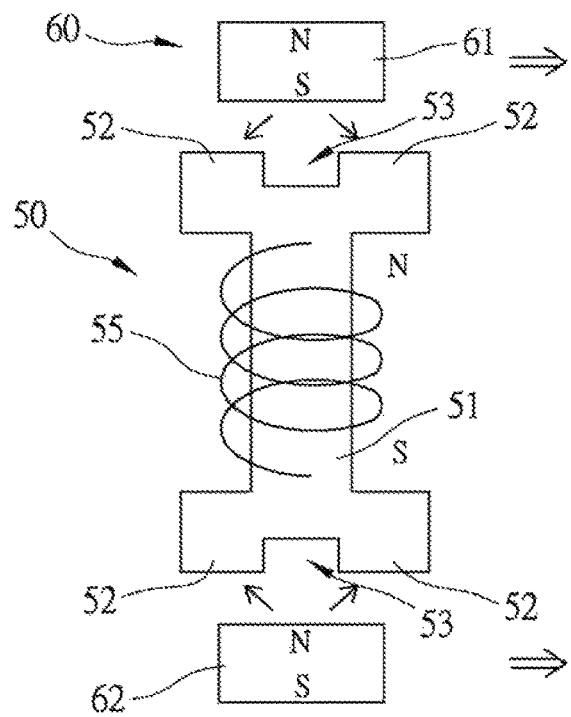
Figure 4C:
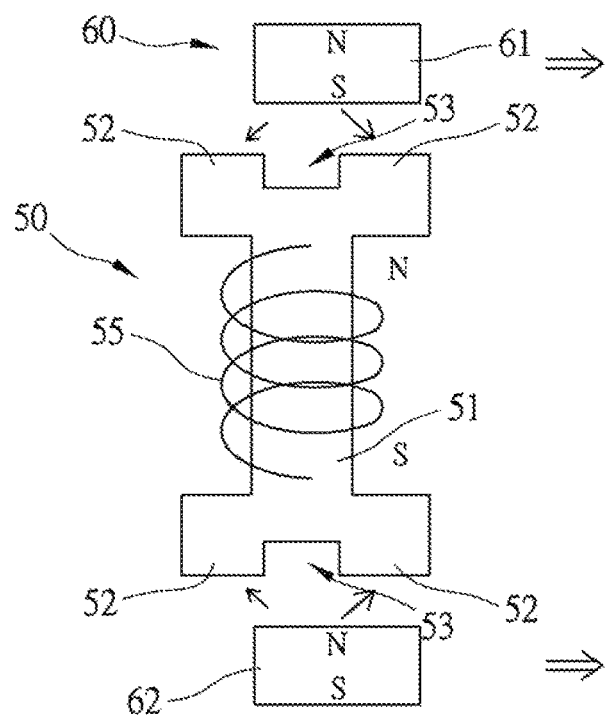

Further, in a dynamic condition where the magnet assembly 60 is moving with respect to the induction coil assembly 50, when the magnetic members 61, 62 of the magnet assembly 60 is moved for entering the coil 55 of the induction coil assembly 50 and is displacing in a direction for approaching the axis of the coil 55 (as shown in FIG. 4A), polarities are induced at the two ends of the coil 55 through magnetic excitation and are identical to the polarities of the magnetic members 61, 62 so as to generate inclined magnetic repulsion forces of which horizontal force components that are in opposite directions cancel each other to thereby reduce the increase of magnetic stress, and the repulsion pushing forces of the conjugate teeth 52 at near ends of the magnetic member 61, 62 are greater than the repulsion blocking forces of the conjugate teeth 52 of far distance so as to generate a forward magnetic assistance force and reduce loss of kinetic energy. Afterwards, when the magnetic members 61, 62 become in alignment with the axis of the coil 55 (as shown in FIG. 4B), the magnetic attraction forces of the conjugate teeth 52 on the opposite sides of the magnetic member 61, 62 become inclined forces of opposite directions so that the horizontal force components on the two opposite sides cancel each other and the vertical force components on the two opposite sides are reduced so as to reduce the increase of magnetic resisting forces and reduce loss of kinetic energy. When the magnetic members 61, 62 pass over the axis of the coil 55 and move away from the axis of the coil 55 (as shown in FIG. 4C), the polarities of the two ends of the coil 55 as induced through magnetic excitation become identical to the polarities of the magnetic members 61, 62 so as to generate inclined forces of opposite directions of which the horizontal force components are of opposite directions and cancel each other to thereby reduce the increase of magnetic resisting force, and the forward attraction force of the conjugate teeth 52 at the near ends of the magnetic member 61, 62 are greater than the opposite pulling forces of the conjugate teeth 52 at far distance so as to generate a forward magnetic assistance force and reduce loss of kinetic energy.

Figure 5:
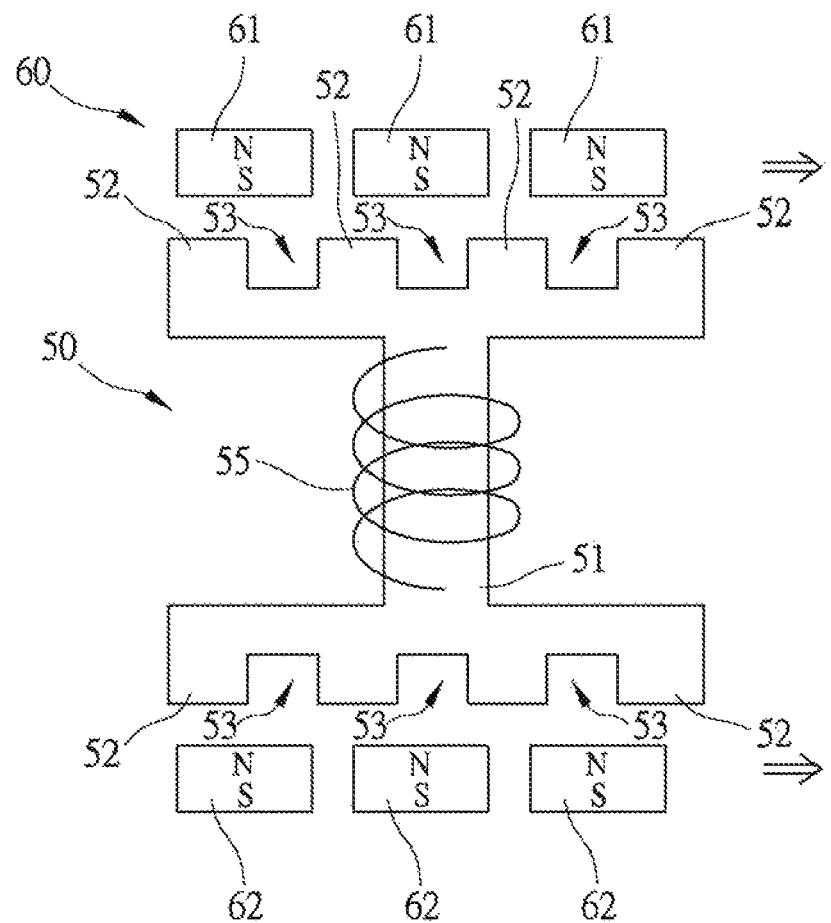
FIG. 5 is a schematic view illustrating a structure of another preferred embodiment of the distributed electromagnetic apparatus of the present invention.

Another preferred embodiment of the distributed electromagnetic apparatus of the present invention, as shown in FIG. 5, is exemplified in such a way that two ends of the magnetic conductor 51 of the induction coil assembly 50 are each provided with four conjugate teeth 52 that are equally spaced and uniformly distributed on two opposite sides of the axis line. The magnet assembly 60 is exemplified in the form of having three magnetic members 61, 62 at each of the two ends of the coil 55, wherein the one of the magnetic members 61, 62 at the middle has a center that corresponds to the axis of the coil 55 and the magnetic members 61, 62 on the two sides have centers each of which is set at a location between centers of two corresponding adjacent conjugate teeth 52.

In summary, in a static condition of the present invention, the magnetic members 61, 62 of the magnet assembly 60 on the two ends of the coil 55 of the induction coil assembly 50 are set in alignment with the axis of the coil 55, and the conjugate teeth 52 arranged on the ends of the magnetic conductor 51 are spaced from each other at intervals of fixed distance so that magnetic attraction forces of the magnetic member 61, 62 with respect to the conjugate teeth 52 on opposite sides thereof are inclined forces of opposite directions and the horizontal force components on the two opposite sides cancel each other and the vertical force components on the two opposite sides are reduced, whereby the resultant static magnetic attraction force is far smaller than that of the prior art device and thus an effect of easy starting can be achieved and the purpose of driving with a minute force may also be achieved to thereby effectively improve utilization of energy; and in a dynamic condition, the two ends of the coil 55 are induced, through magnetic excitation, to generate polarities that generate inclined magnetic stress with respect to the magnetic members 61, 62, such that the horizontal force components thereof are opposite and cancel each other so as to reduce the increase of magnetic resisting force and to generate a forward magnetic assistance force, thereby effectively reducing loss of kinetic energy and increasing kinetic energy thereof and to increase the operational speed under the assistance of the forward magnetic assistance force to further improve energy conversion rate thereof.

As such, it is understood that the present invention provides an invention of extreme creativity to greatly improve performance thereof, in addition to overcoming all the problems of the prior art, with no identical or similar product in this field being created or publically used to improve performance.

We claim:

1. A distributed electromagnetic apparatus, which comprises an induction coil assembly that is defined as a stator or a rotor and a magnet assembly that is defined as a rotor or a stator, characterized in that:

the induction coil assembly comprises a magnetic conductor and a coil, the coil being wound around an outer circumference of the magnetic conductor, a direction of extension of winding turns of the coil on the magnetic conductor being perpendicular to a moving direction of the rotor, two ends of the magnetic conductor being made projecting outward to form at least two spaced conjugate teeth, each of the at least two spaced conjugate teeth having the same width and height, a tooth valley section being formed between adjacent conjugate teeth, each of the tooth valley sections having the same width and depth; and the magnet assembly is arranged to have at least one spaced magnetic member on each of two ends of the coil, the spaced magnetic members being arranged in pair as being opposite to each other with opposite polarities facing each other, one of the spaced magnetic members that is located at the middle of the two ends of the coil having a center corresponding to an axis line of the coil, centers of the spaced magnetic members that are located at two opposite sides being each set at a location between centers of two adjacent conjugate teeth of the magnetic conductor, the spaced magnetic members on the same side being arranged to space from each other at fixed intervals, each of the spaced magnetic members being of the same size.

2. The distributed electromagnetic apparatus according to claim 1, characterized in that the two ends of the magnetic conductor of the induction coil assembly are each provided with four conjugate teeth that are equally spaced and uniformly distributed on two opposite sides of the axis line, the magnet assembly having three magnet members at each of two ends of the coil, wherein a center of a middle one of the spaced magnetic members corresponds to the axis line of the coil and the spaced magnetic members on the two opposite sides have centers each of which is set at a location between centers of two corresponding adjacent conjugate teeth.

3. A distributed electromagnetic apparatus, which comprises an induction coil assembly that is defined as a stator or a rotor and a magnet assembly that is defined as a rotor or a stator, characterized in that: the induction coil assembly comprises a magnetic conductor and a coil, the coil being wound around an outer circumference of the magnetic conductor, a direction of extension of winding turns of the coil on the magnetic conductor being perpendicular to a moving direction of the rotor, two ends of the magnetic conductor being made projecting outward to form two spaced conjugate teeth, each of the two spaced conjugate teeth having the same width and height, a tooth valley section being formed between the two spaced conjugate teeth; and the magnet assembly is arranged to have one magnetic member on each of two ends of the coil, the magnetic members being opposite to each other with opposite polarities facing each other, the magnetic members having a center corresponding to an axis of the coil, the magnetic members on two opposite sides being of the same size.

* * * * *